United States Patent [19]

Roberg et al.

[11] 3,743,081

[45] July 3, 1973

[54] CASSETTE ALBUM CONTAINER

[75] Inventors: Kurt W. Roberg, Tenafly; Ernest F. Marotti, Old Bridge, both of N.J.

[73] Assignee: W. R. Grace & Co., New York, N.Y.

[22] Filed: Feb. 25, 1971

[21] Appl. No.: 118,814

[52] U.S. Cl. .............. 206/1 R, 206/DIG. 36, 281/29

[51] Int. Cl. ........................ A45c 11/00, B65d 85/67, B65d/5/50

[58] Field of Search ........... 206/1 R, 65 R, DIG. 36, 206/DIG. 32, 63.2; 281/29

[56] References Cited

UNITED STATES PATENTS

| | | | |
|---|---|---|---|
| 3,640,379 | 2/1972 | Weingarden | 206/1 R |
| 3,620,367 | 11/1971 | Stembel | 206/65 R |
| 3,215,450 | 11/1965 | Peterson et al. | 281/29 |
| 521,102 | 6/1894 | Crocker | 206/DIG. 32 |
| 3,305,084 | 2/1967 | Higgins et al. | 206/63.2 R |
| 3,487,919 | 1/1970 | Elliott et al. | 206/DIG. 36 |

*Primary Examiner*—William T. Dixson, Jr.
*Attorney*—William W. McDowell, Jr. and Kenneth E. Prince

[57] ABSTRACT

A book-style album container for cassettes of magnetic tape, film or the like comprising a hinged outer cover, and a pair of storage bodies, one on the inner side of each cover leaf, each such body including a plurality of storage cavities, each such cavity adapted to removably and snugly receive an individual cassette and including means to facilitate removal of individual cassettes when desired. The invention also includes a method for making an album container of the type described.

4 Claims, 6 Drawing Figures

PATENTED JUL 3 1973
3,743,081
Fig. 1
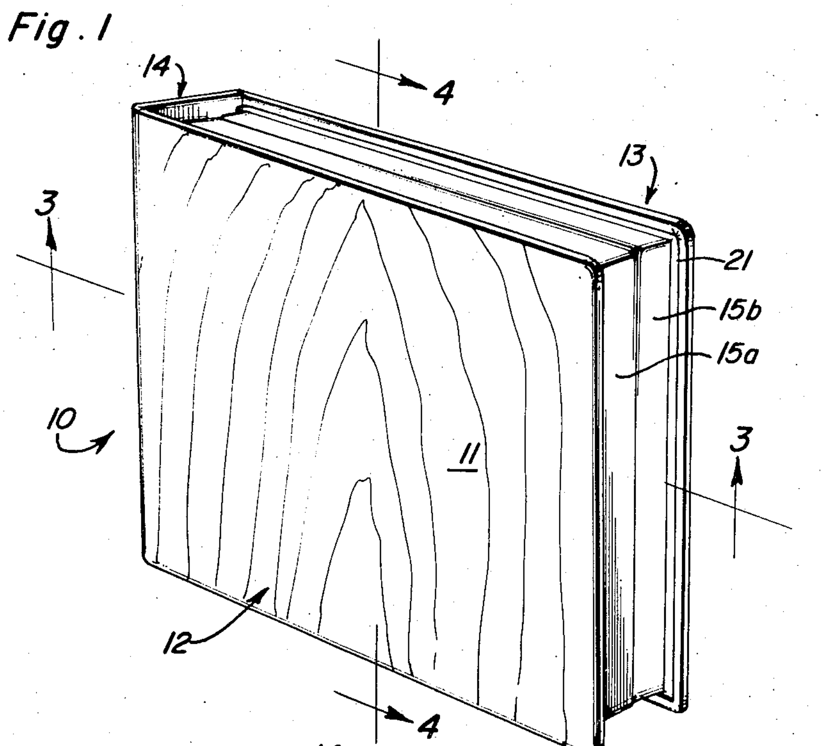
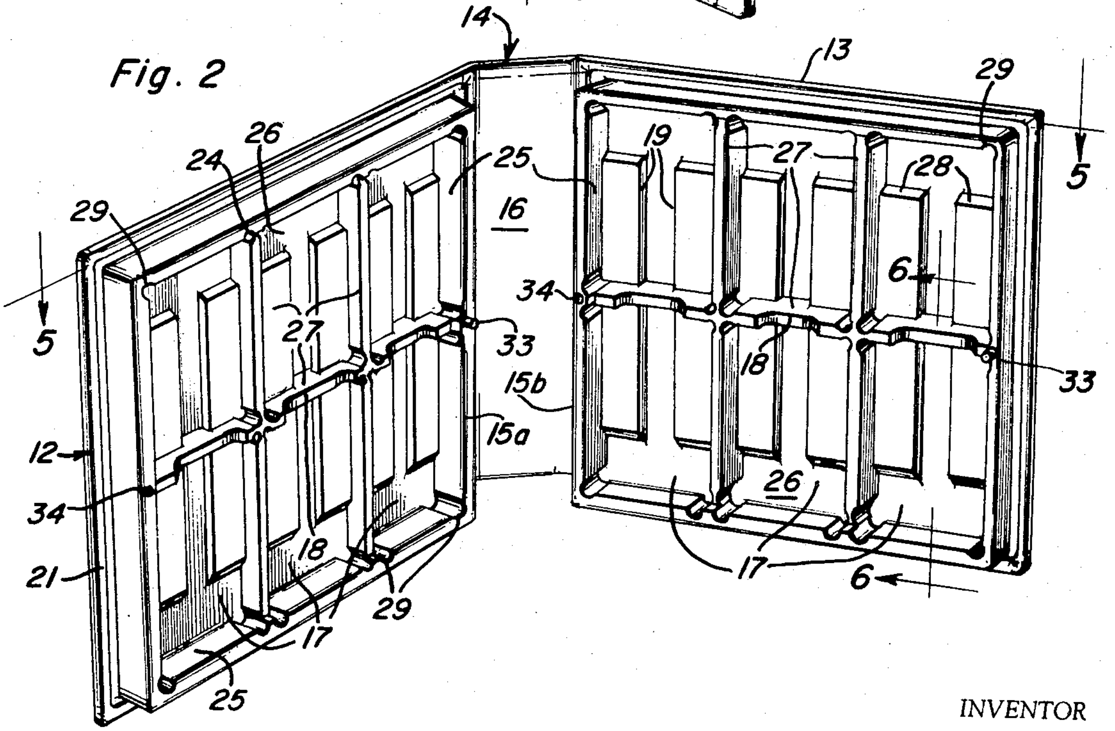
INVENTOR
Kurt W. Roberg
Ernest F. Marotti
BY William W. McDowell Jr.
ATTORNEY Fig. 3
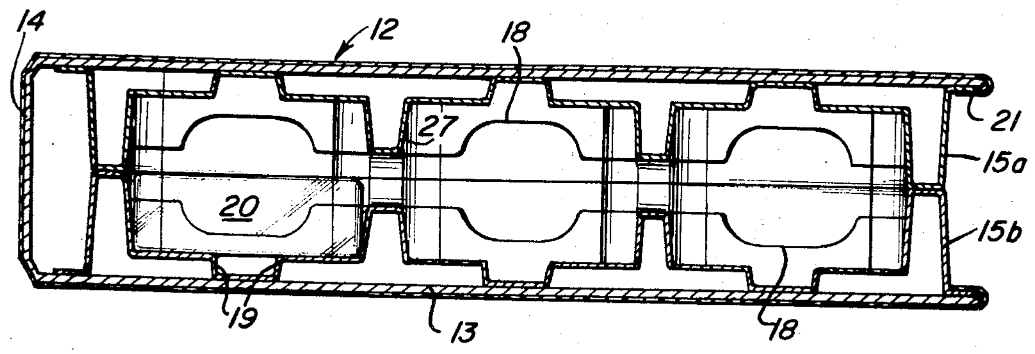
Fig. 4
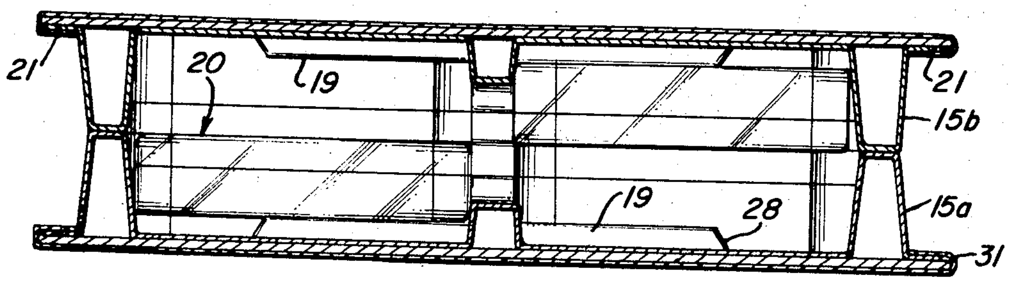
Fig. 5
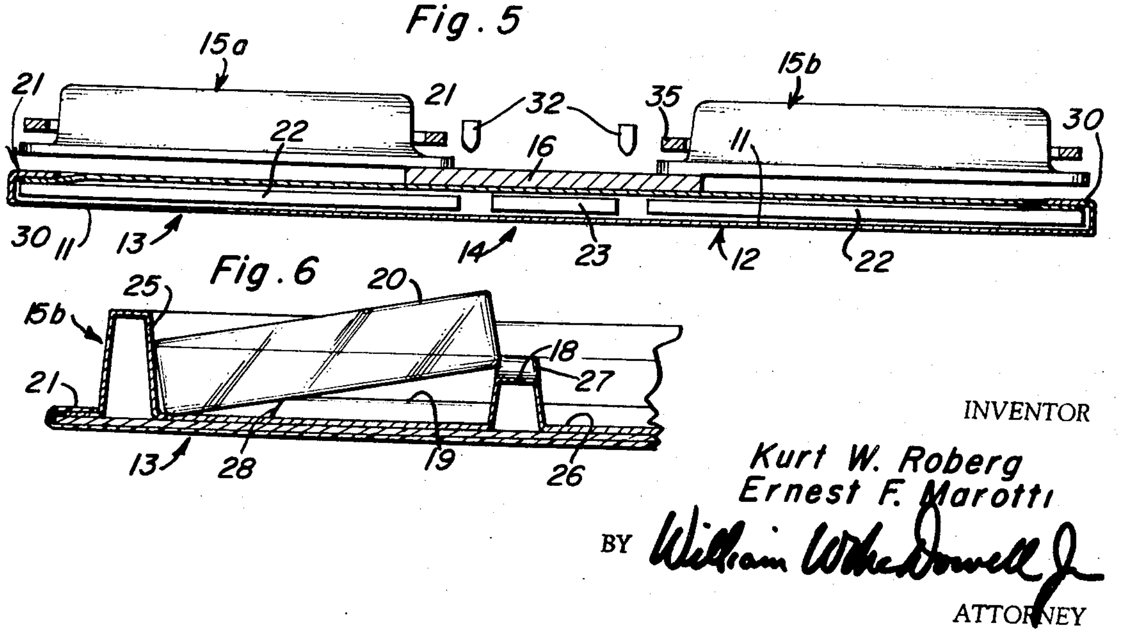
Fig. 5, Fig. 6
INVENTOR
Kurt W. Roberg
Ernest F. Marotti
BY William W. McDowell Jr.
ATTORNEY

CASSETTE ALBUM CONTAINER

The present invention relates to a book-style album container for storing cassettes of magnetic recording tape, film, or the like during the periods between uses thereof. The invention is especially designed for storage of magnetic recording tape cassettes held in individual protective and dust proof storage cases of the type described and claimed in their original U.S. Pat. No. 3,272,325 to Schoenmakers.

Containers for the storage of tape cassettes, film reels, and the like whereby the same may be retained in neat manner for ready access when it is desired to use them are the subject of considerable current activity. Casings or containers for storing individual tape cassettes are suggested by U.S. Pat. No. 3,232,421 to Young and in the aforementioned Schoenmakers patent. Recently issued U.S. Pat. No. 3,487,919 to Elliott et al. describes and claims a book-like container for storing a plurality of individual reels of movie film or the like. While this container offers a step forward in the art it does not provide means permitting rapid and facile access to the stored reels. Moreover the Elliott et al. container is not readily adaptable to storage of cases such as those disclosed in the Schoenmakers patent since it is obvious that these cases do not provide means for easy fingernail removal in the manner illustrated in connection with the Elliott et al. container. A book-like container somewhat similar to Elliott et al. is described in Berman's U.S. Pat. No. 3,315,718. Berman's container, like Elliott's, is not suitably designed for facile removal of snugly stored tape cassettes in individual storage cases. One rather crude possible solution to the problem of easy removal is suggested in the 1894 U.S. Pat. No. 521,102 to Crocker. The Crocker device is not adapted for secure, separate storage of individual cases or reels and is not one suitable for modern-day high speed production techniques.

Is it an object of this invention to provide an improved book-style album container for cartridges or cassettes of magnetic recording tape and the like. Another object is to provide a method for making such improved book-style album containers. Other objects and advantages of the invention will become apparent from the following more detailed description of the invention and the illustrated presently preferred embodiment thereof.

In the drawings illustrating the presently preferred embodiment:

FIG. 1 is a perspective view of the closed, book-like container;

FIG. 2 is a perspective view of the container of FIG. 1 in an "open" position;

FIG. 3 is a sectional view taken generally on line 3—3 of FIG. 1;

FIG. 4 is a sectional view taken generally on line 4—4 of FIG. 1;

FIG. 5 is a sectional view taken generally on line 5—5 of FIG. 2 and illustrating a preferred method of fabricating the container;

FIG. 6 is a partial sectional view taken generally on line 6—6 of FIG. 2 and illustrating the manner of removing stored cartridges or cassettes from the container.

In summary, the book-style album container of the present invention comprises a pair of cover sections connected by a hinge section, a preformed container member carried by each cover section, each container member having a plurality of spaced-apart pockets, each adapted to snugly and removably receive a cartridge or cassette storage case and each including protuberant means to facilitate removal of a cartridge or cassette storage case held therein.

In summary the method of this invention comprises providing a sheet of cover material of preselected length and width; superimposing over opposed ends of said sheet a pair of stiffening members of preselected length less than the length of the sheet of heat sealable material and preselected width less than one-half the width of the said sheet; superimposing centrally of said sheet and between said pair of stiffening members a third stiffening member of preselected length like the length of the pair of stiffening members and preselected width sufficient to provide hingeforming spacings between the third stiffening member and each of the pair of stiffening members; folding the exposed edges of the sheet of cover material over the outer edges of the stiffening members; superimposing a second, smaller sheet of cover material over the third stiffening member, partially over the portions of the first pair of stiffening members adjacent the third stiffening member and over the underlying portions of the folded edges of the larger first sheet of cover material; superimposing over each of the first pair of stiffening members a container member having a peripheral flange of dimensions slightly less than the dimensions of the individual ones of the first pair of stiffening members and having a height dimension approximately one-half the width dimension of the third stiffening member; and securing together the peripheral flange of the container members, the interlying portions of the second, smaller sheet of cover material, the interlying folded portions of the first sheet of cover material and the underlying pair of stiffening members.

The presently preferred embodiment of the album container of this invention as illustrated in the drawings is generally designated as album 10 comprising a "front" cover 12, "back" cover 13 and hinge section 14. Each cover section has secured to it a container member **15*a* or 15*b*, the thickness dimension of which is approximately or substantially one-half the width dimension of the hinge section 14.**

The container members are suitably formed by vacuum or pressure molding of a suitable preferably heat sealable material such as biaxially oriented polystyrene or the like to include a plurality of cassette-holding pockets 17 encompassed within a generally rectangular container frame including inverted U-shaped side walls 25 with top portion 24 and an outwardly extending overall peripheral flange portion 21, and a bottom portion 26. The top plane of the inverted U-shaped interior partitioning walls 27 is somewhat below the level of the plane of top portion 24. At least one of the partitioning walls has a recessed portion 18. The bottom portion 26 of the container members also includes at least one protuberance 19 in each pocket 17. In the illustrated preferred embodiment there are two protuberances 19 in each pocket, contiguous with opposed partition walls 27 of that pocket and extending for at least about one-half, preferably not more than about two-thirds of the length of the partition wall. As illustrated the protuberances 19 terminate in an inclined end 28 which is contiguous with the bottom wall 26 of the container member.

As best seen in FIG. 6 a cartridge or cassette in storage case 20 is removable from a pocket 17 by pressing one end thereof so that the cassette rotates on the protuberances 19, raising the opposite end above the level of partition walls 27 for manual removal. This removal is facilitated by the previously described recess portion 18 in the appropriate partition walls.

In the illustrated preferred embodiment the corners of each pocket 17 are of recessed cylindrical construction 29, as best seen in FIG. 2. This provides strong corners for the pockets while at the same time permitting the rectangular corners of the cassette storage case 20 to clear the corners without interference.

In the presently preferred embodiment the album is held closed when not in use by mating integrally formed pins 33 and integrally formed holes 34 (as seen for example in FIG. 2). Each container member has one male and one female unit interacting with the mating unit on the other container member. Other closure means will be apparent.

Internal construction and method of assembly of the preferred embodiment is most readily seen from a consideration of FIG. 5. Briefly, the cover sections 12 and 13 comprise a stiffener member 22 (made of, e.g., cardboard) while the hinge section includes a like stiffener member 23. These stiffening members are appropriately placed on an overall sheet 11 of cover material, preferably heat sealable plastic material such as plasticized polyvinylchloride, and all edges of the sheet are suitably folded over the stiffeners (e.g., "end" folds 30 in FIG. 5 and "top side" edge fold 31 in FIG. 4). A second smaller sheet 16 of material, preferably also heat sealable material like sheet 11, is superimposed over the hinge section and adjoining portions of the two cover sections. Finally the container members **15*a* and 15*b* are superimposed over the respective cover sections and all parts suitably secured together through the flange 21 of the container members. Any suitable method may be used for securing together the assembly units, e.g., sewing, adhesives, heat sealing or the like. It is preferred, but not necessary, to construct the appropriate elements of heat sealable material and to heat seal the various units, after appropriately positioning them as illustrated in FIG. 5, through the flange 21 of the container members, thus sealing together the various superimposed plastic layers to each other and to the underlying portions of the cardboard stiffeners 22 and 23. Thus, FIG. 5 schematically shows heat sealing bars 35 for a heat sealing securing step. If desirable or necessary spacer bars or rods 32 are used to keep the hinge section stiffener 23** in proper position during the securing operation.

It will be understood that any number of variations or modifications of the presently preferred embodiment, as described above, may be made without departing from the spirit or scope of the invention as claimed. Thus, for example, the protuberances 19 may take a variety of shapes and may be positioned in a variety of positions within the pockets 17.

What is claimed is:

1. Book-style album container for cassettes in individual storage cases comprising:

a. a pair of cover sections connected by a hinge section;

b. a preformed container member carried by each of said cover sections with one edge adjacent to but spaced at least slightly away from the hinge section and having a thickness or height dimension substantially equal to one-half the width dimension of the said hinge section;

c. each said container member comprising a plurality of spaced apart pockets generally rectangular in shape, each adapted to snugly but removably receive and hold therein a cartridge or cassette storage case;

d. each said pocket including a pair of elongated, substantially flat protuberances on its otherwise flat bottom wall contiguous with opposed side walls of the pocket and extending outwardly from a first one of the opposed pocket end walls towards the second opposed end wall for about one-half to about two-thirds of the length of said side walls and terminating in an inclined end portion; and a recessed portion in the said first one of the opposed end walls to facilitate removal of a cassette storage case held within said pocket when pressure is applied to the top of the storage case at a point near the said second end wall.

2. Container as defined in claim 1 wherein the corners of each pocket are of recessed cylindrical shape.

3. Container as defined in claim 1 wherein said container members include a peripheral flange overlying and of substantially the same overall dimensions as the cover sections.

4. Container as defined in claim 3 wherein the cover sections and container member units are secured together by heat sealing.

* * * * *